April 11, 1961　　　D. S. PETTINGER　　　2,979,451
GAS SAMPLING APPARATUS

Filed Sept. 25, 1957　　　　　　　　　　6 Sheets—Sheet 1

DONALD STANLEY PETTINGER
Inventor
Attorneys

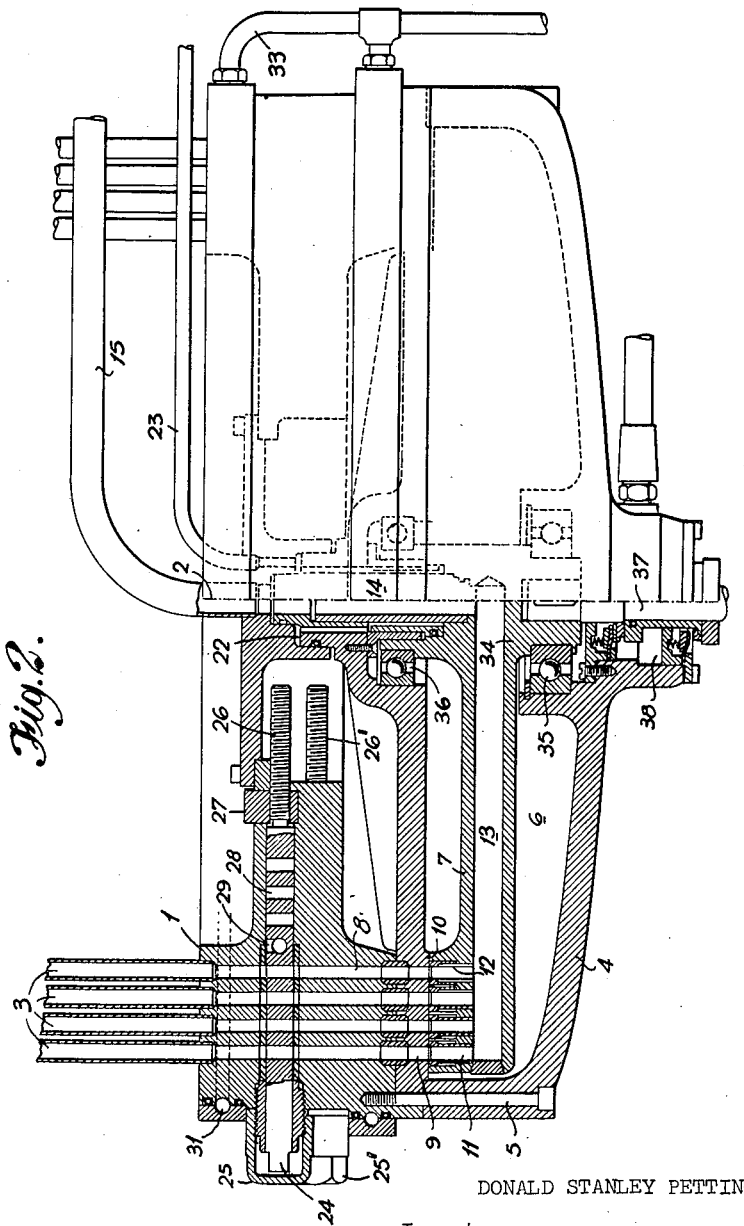

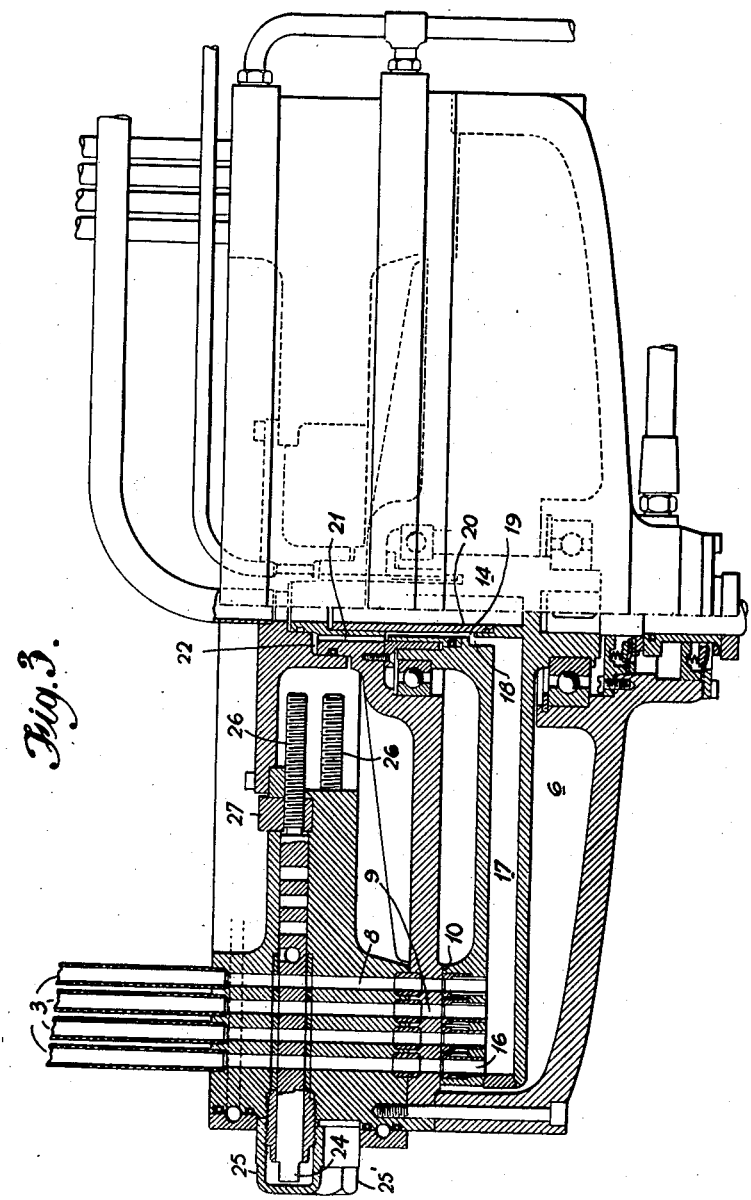

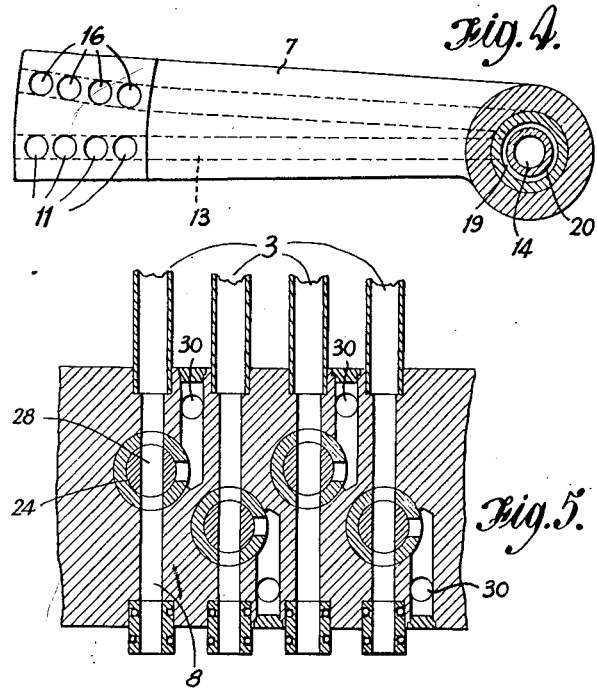
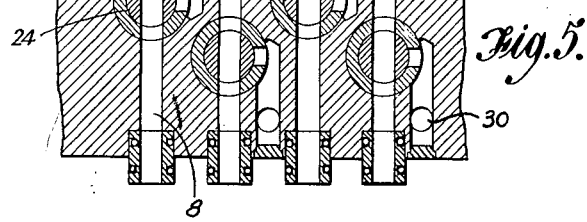
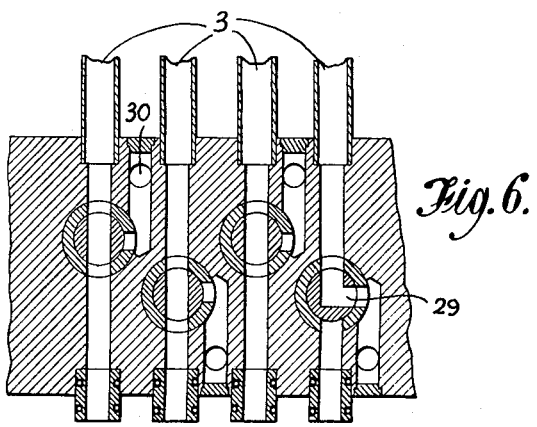
DONALD STANLEY PETTINGER
Inventor

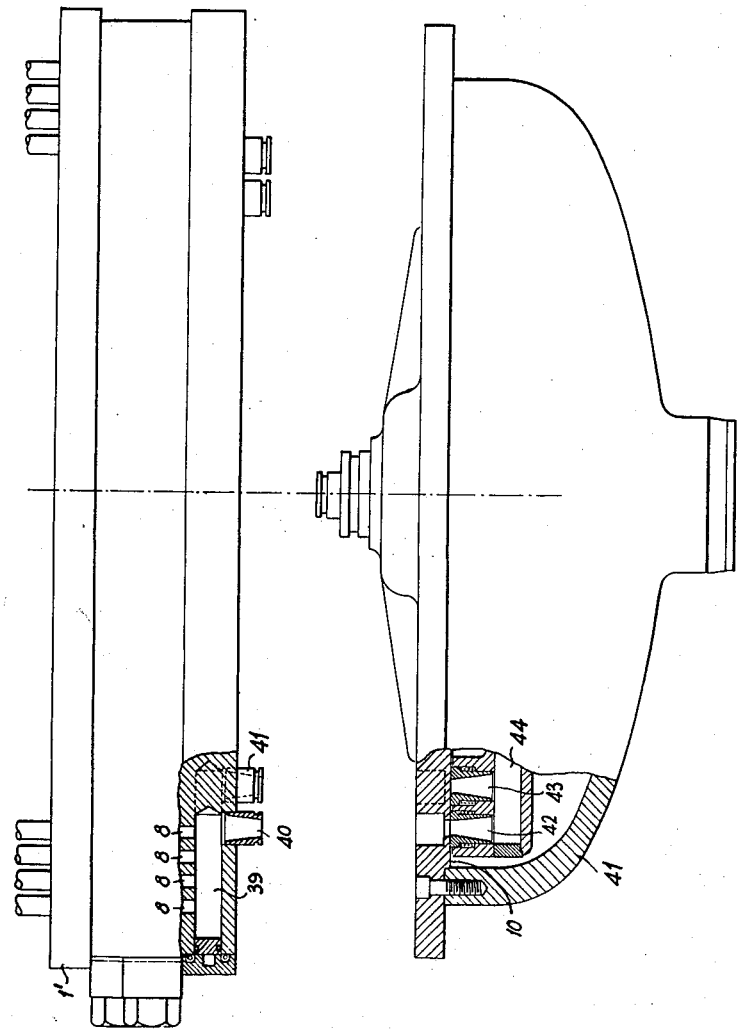

United States Patent Office 2,979,451
Patented Apr. 11, 1961

2,979,451
GAS SAMPLING APPARATUS

Donald Stanley Pettinger, Sale, England, assignor to A.E.I.-John Thompson Nuclear Energy Company Limited, London, England, a British company Filed Sept. 25, 1957, Ser. No. 686,071

Claims priority, application Great Britain Sept. 26, 1956

3 Claims. (Cl. 204—193.2)

This invention relates to gas selector valves and more particularly to apparatus for successively connecting a number of gas sources to sampling apparatus.

The invention has an important application in connecting the core channels of gas cooled nuclear reactors to sampling apparatus.

In such equipment there are a large number of core passages for the gas coolant each of which passages has to be connected to the sampling apparatus cyclically so that every gas passage is inspected periodically. It is also important in such apparatus to clear away stale gas from the lines before they are sampled.

The main object of the invention is to provide improved apparatus satisfying these requirements.

According to the present invention a gas selector valve comprises a plurality of inlet gas ducts extending through a valve body and terminating in ports extending around a pitch circle on an annular valve face located in an enclosed chamber together with a rotatable selector arm having an annular face slidable over the valve face and making a substantially gas tight fit therewith, said selector arm having a pair of ports adapted to register respectively with any adjacent pair of ports around the valve face and in which one of the ports of the selector arm is connected to sampling apparatus and the other port to scavenging apparatus and the arrangement is such that by rotating the selector arm each gas duct in the valve body may be in turn connected to the scavenging apparatus and then to the sampling apparatus.

The valve face is preferably an annular plane surface extending transversely to the axis of rotation of the selector arm which arm has a corresponding surface which abuts against and slides over the valve face.

Alternatively, the valve face might be an internal cylindrical surface described about the axis of rotation in which case the end of the selector arm would have a corresponding external surface.

According to a preferred arrangement the inlet passages and ports in the valve face are arranged in sets and the selector arm has two sets of ports, i.e. a set of scavenging ports and a set of sampling ports, each adapted to engage simultaneously with a respective set of ports in the valve face and the arrangement being such that as the selector arm rotates each set of inlet lines is first connected by the scavenging ports to the scavenging apparatus and then by the sampling ports to the sampling apparatus.

In arrangements in which the valve face is in a plane transverse to the selector arm axis, the ports of each set would be aligned radially and corresponding ports of each set would be arranged on pitch circles about said selector arm axis.

Means may also be provided for disconnecting any inlet duct in the valve body from its associated port in the valve face and for alternatively connecting such a duct to sampling apparatus.

In order that the invention may be more clearly understood reference will now be made to the accompanying drawings, in which:

Fig. 2 is a vertical elevation showing the left half in a section on the line II—II of Fig. 1.

Fig. 3 is a detail view of the apparatus shown in Fig. 2 but is a section taken on the line III—III of Fig. 1.

Fig. 4 is a plan view of the selector arm.

Fig. 5 is a section on the line V—V of Fig. 1.

Fig. 6 is a similar view to Fig. 5 but illustrates the position of the valve when one of the lines has been connected to individual sampling apparatus.

Fig. 7 shows a modified arrangement of the ports, and

Figure 1:
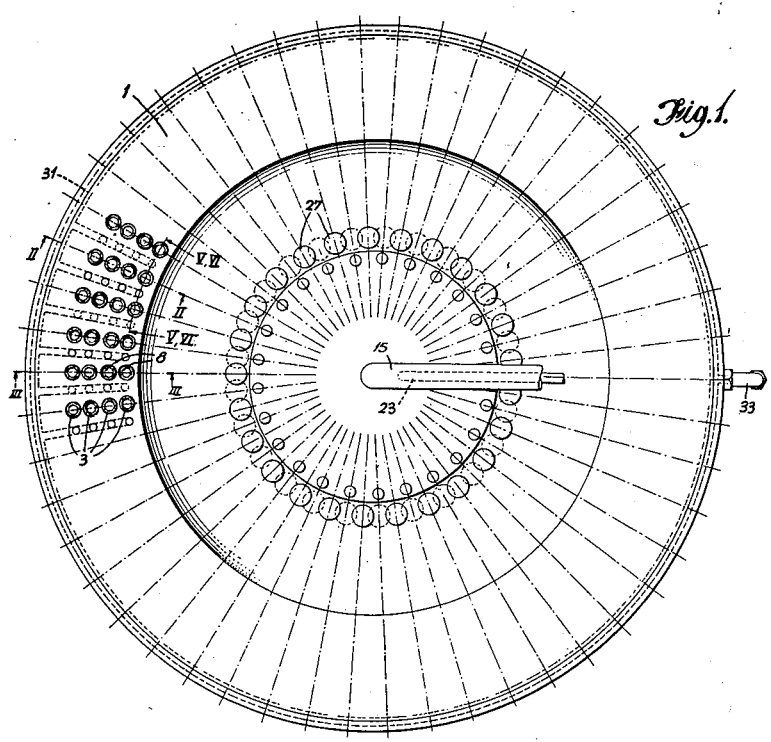
Fig. 1 is a plan view of a selector valve embodying the invention.

Referring first to Figs. 1 and 2 the apparatus essentially comprises a valve body, which is substantially symmetrical about a vertical axis 2 and to the top face of which are coupled a number of gas lines 3 from the various sources, i.e. gas passages to be sampled. In the embodiment shown these gas lines are arranged in sets of four, each set being distributed around concentric pitch circles. The lower face of the valve body is enclosed by a cover plate 4, which is secured to the valve body by bolts 5; this forms an enclosed gas space 6. Within this space a selector arm 7 rotates about the vertical axis 2; it being appreciated that the valve body 1 and the cover plate 4 are stationary. From each of the gas lines 3 a duct 8 extends vertically downwards through the valve body 1 to a corresponding port 9 in the horizontal valve face 10. The selector arm 7 is formed with a corresponding surface which abuts against the valve surface 10 and slides over it when the selector arm is rotated. When the selector arm 7 is correctly positioned angularly each of the ports 11 registers with a corresponding port 9 in the valve face plate 10, the coupling being made substantially gas tight by spring bushings 12 around each of the ports 11, which bushings are spring pressed against the valve face. Each port 11 is connected to a common duct 13 extending radially through the selector arm and which in turn connects with an axial duct 14 and thence through an external line 15 to sampling apparatus, not shown in Fig. 2. At the same time the scavenging ports 16 (Fig. 3) will register with the adjacent set of valve ports 9. These ports 16 are connected through a horizontal line 17 and thence through ports 18 with an annular space 19 extending upwardly around the wall 20 of the duct 14. From the top of the space 19 communication is effected through passages 21 with an annular space 22 in the valve body which space is connected through a line 23 with scavenging apparatus. In operation the selector arm 7 is rotated step-by-step and rests for a period of 30 seconds between each movement. Thus, first of all the scavenging ports 16 will register with a set of valve ports 9 for 30 seconds whilst the sampling ports 11 will register with the adjacent set of valve ports.

At the end of this period the selector arm 7 will be rotated by one step so that the ports 11 will now register with the valve ports 9 which previously registered with the scavenging ports 16, which scavenging ports now register with a new set of valve ports. In this way each of the gas inlet lines is scavenged before it is connected to the sampling apparatus.

According to a further feature of the invention means are provided for connecting any of the individual gas lines 3 to individual sampling apparatus. This is effected by valves 24 extending radially across each set of ducts 8. It will be observed from Figs. 5 and 6 that the valves are not all in the same horizontal plane but alternate valves are staggered vertically for economy of space.

The outer ends of each valve (Fig. 2) are covered with a removal cover plate 25; after the removal of the cover plate the valve may be rotated. The inner ends of the valves have a screw threaded extension 26 which engages a screwed boss 27 so that when a valve is rotated it is shifted radially. In Fig. 2 the valve 24 is shown in its radially innermost position. In this position all the inlet lines 3 are connected with the corresponding ducts 8 through diametric ports 28 in the valve body 24. The rotation of the valve through two turns will shift the valve bodily to the left, i.e. outwards, by an amount equivalent to the spacing between the adjacent ducts 8 so that each port 28 will move to the next passage 8; the outermost port 28 will not register with the outer duct 8 but the movement will shift the sampling port 29 to register with the innermost supply line 3 and cut this off from the associated duct 8. This passage 29, instead of being diametrical, is of a right angle elbow type, as shown in the right hand side of the sectional view Fig. 6. When this is aligned with one of the inlet lines 3 this line is cut off from the scavenging and the group sampling lines but is alternatively connected via a horizontal radial passage 30 (Fig. 5) with a duct 31 (Fig. 2) extending circumferentially around the valve body. This duct 31 in turn is connected through a line 33 with individual sampling apparatus.

By rotating the valve an additional amount the passage 29 may be caused to register with any of the other inlet lines 3, there being additional diametrical ports 28 provided to the right of the right angle passage 29.

In this way any individual line may be connected to the individual sampling apparatus for special investigation.

The individual ducts 8 are sealed from each other by sealing bushes encircling the valve 24 between the ducts 8.

As previously mentioned alternate valves are staggered vertically and 25′ represents the cover plate of an adjacent valve which is displaced downwards and similarly 26′ is the screwed end of the same valve. The rotating selector arm 7 is mounted on a central hub 34 carried on ball races 35 and 36. It is driven from a shaft 37 provided with a clutch by which the drive may be disconnected. Normally the drive will be connected to position indicating apparatus so that the set of gas lines 3 which are being sampled at any instant will be known.

Fig. 7 shows a modified arrangement of ports in the valve face in which instead of all the ducts 8 having individual ports 9 each set of ducts communicates with a radially extending manifold passage 39 which has a single port 40 in the valve face.

In the arrangement shown alternate ports are staggered radially, i.e. the next manifold will connect with the port 41.

With such an arrangement the selector arm has only two sampling ports 42 and 43 connected to a common line 44. Similarly it will have two scavenging ports arranged on the same pitch circles.

Figure 8:
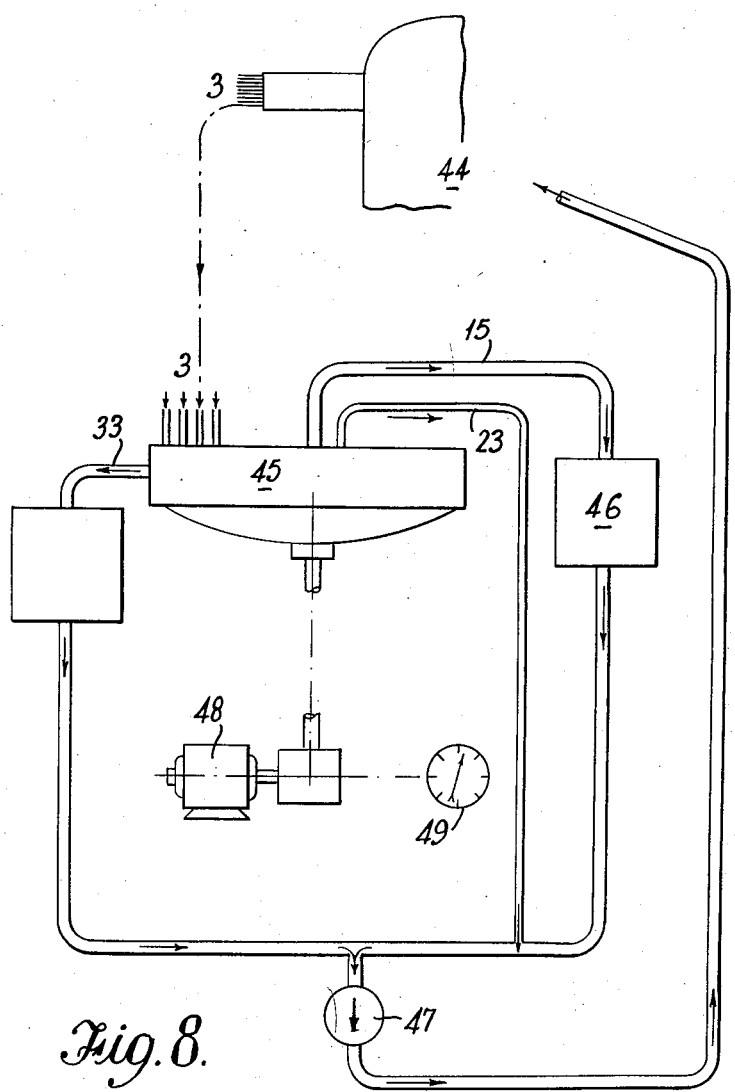
Fig. 8 shows how the valve would be connected up to a reactor.

Fig. 8 shows diagrammatically how the selector valve would be arranged in a reactor. The reference 44 indicates the pile generally and 45 is the selector valve which is, on the one hand, coupled through inlet gas lines 3 to the various gas passages in the pile and is rotated by a motor 48 preferably with a step-by-step movement, i.e. so as to pause when such inlet port or set of inlet ports registers with the selector arm ports.

The scavenging line 23 is connected to suitable scavenging apparatus 47 and similarly the sampling line 15 is connected to sampling apparatus 46. Indicating apparatus 49 provides an indication of the gas ducts which are being sampled by indicating the positioning of the selector arm.

What I claim is:

1. In a nuclear reactor having a plurality of gas channels, a gas tight selector valve comprising a valve body and a selector member rotatable relatively to the valve body, co-engaging annular faces on the valve body and selector member respectively, which faces engage together slidably with a substantially gas tight fit, a plurality of inlet gas ducts, ports terminating said ducts and uniformly spaced about a plurality of concentric pitch circles on the annular valve face, a plurality of scavenging ports on the selector member face located about the same pitch circles respectively as the inlet ports, a plurality of sampling ports on the selector member face also located about the same pitch circles respectively as the inlet ports and displaced circumferentially from the scavenging ports so that there is a scavenging port and a sampling port corresponding to each pitch circle whereby as the selector member rotates each inlet port registers first with a scavenging port and then with a sampling port, a gas tight casing enclosing said annular faces, scavenging apparatus connected to said scavenging ports and sampling apparatus connected to said sampling ports.

2. A nuclear reactor according to claim 1 further comprising duct means disposed in said valve body for connection with individual sampling apparatus and valve means mounted transverse said plurality of inlet ducts for diverting the gas flowing in any required inlet duct to said duct means for connection with individual sampling apparatus.

3. A nuclear reactor according to claim 2 wherein said valve means comprises a plurality of valve members each displaceable along its own longitudinal axis and having first spaced passages communicating with said inlet ducts and at least one second passage disposed to alternatively communicate with one of said inlet ducts and divert inflowing gas from said duct to said duct means for connection with individual sampling apparatus.

References Cited in the file of this patent

UNITED STATES PATENTS

| | | |
|---|---|---|
| 1,185,532 | Pfouts | May 30, 1916 |
| 1,856,226 | Rustin et al. | May 3, 1932 |
| 2,695,036 | Kronheim | Nov. 23, 1954 |
| 2,700,280 | Heuser | Jan. 25, 1955 |
| 2,869,526 | Dolza | Jan. 20, 1959 |

OTHER REFERENCES

Nucleonics, vol. 14, No. 12, December 1956, page 520.

Proceedings of the International Conference on the Peaceful Uses of Atomic Energy. Held in Geneva, August 8–20, 1955, vol. III, pages 89–90, New York, United Nations, 1956.